(12) United States Patent
Franklin

(10) Patent No.: US 7,475,510 B2
(45) Date of Patent: Jan. 13, 2009

(54) QUICK CHANGE FISHING IMPLEMENT

(76) Inventor: Jeffrey Bruce Franklin, 385 PVT Rd. 5975, P.O. Box, Yantis, TX (US) 75497

( * ) Notice: Subject to any disclaimer, the term of this patent is extended or adjusted under 35 U.S.C. 154(b) by 0 days.

(21) Appl. No.: 11/513,344

(22) Filed: Aug. 31, 2006

(65) Prior Publication Data
US 2007/0044369 A1  Mar. 1, 2007

Related U.S. Application Data

(60) Provisional application No. 60/712,836, filed on Sep. 1, 2005.

(51) Int. Cl.
*A01K 95/00* (2006.01)
(52) U.S. Cl. ......................... 43/44.91; 43/44.9
(58) Field of Classification Search ................. 43/43.1, 43/44.9, 44.91
See application file for complete search history.

(56) References Cited

U.S. PATENT DOCUMENTS

| | | | | |
|---|---|---|---|---|
| 231,417 A * | 8/1880 | Foote | ........................... | 43/44.9 |
| 441,447 A * | 11/1890 | Stahl | ........................... | 43/43.1 |
| 484,254 A * | 10/1892 | Settle | ........................... | 43/43.1 |
| 1,193,912 A * | 8/1916 | Maire et al. | ................... | 43/43.1 |
| 1,480,655 A * | 1/1924 | Bennett | ........................ | 43/43.1 |
| 1,618,100 A * | 2/1927 | Lowry | ......................... | 43/44.9 |
| 1,848,600 A * | 3/1932 | Best | ............................ | 43/43.1 |
| 1,883,574 A * | 10/1932 | Cleeland | ..................... | 43/43.1 |
| D107,418 S * | 12/1937 | Ganaway | .................... | D22/145 |
| 2,269,615 A * | 1/1942 | Walker | ........................ | 43/43.1 |
| 2,315,322 A * | 3/1943 | Fenley | ......................... | 43/44.9 |
| 2,599,973 A * | 6/1952 | Bujaky | ....................... | 43/44.95 |
| 2,724,206 A * | 11/1955 | Miller | ........................ | 43/43.1 |
| 2,753,652 A * | 7/1956 | Romaine | ..................... | 43/43.1 |
| 2,811,805 A * | 11/1957 | McGee | ........................ | 43/43.1 |
| 3,104,487 A * | 9/1963 | Havel | ........................ | 43/43.11 |
| 3,192,662 A * | 7/1965 | Hoyle | ........................ | 43/44.91 |
| 3,701,212 A * | 10/1972 | Gilliam | ..................... | 43/44.87 |
| 3,782,025 A * | 1/1974 | Kochevar | .................... | 43/44.9 |
| 4,060,927 A * | 12/1977 | Haun et al. | .................. | 43/43.1 |
| 4,418,492 A * | 12/1983 | Rayburn | ..................... | 43/44.9 |
| 4,635,392 A * | 1/1987 | Wirkus | ....................... | 43/44.9 |
| 4,696,125 A * | 9/1987 | Rayburn | .................... | 43/43.14 |
| 4,949,645 A * | 8/1990 | Hayward et al. | ............ | 102/517 |
| 5,014,459 A * | 5/1991 | Sublet | ....................... | 43/44.85 |
| 5,031,351 A * | 7/1991 | Rogel | .......................... | 43/44.9 |
| 5,157,860 A * | 10/1992 | Clark | .......................... | 43/44.9 |
| 5,165,195 A * | 11/1992 | Matsui | ........................ | 43/43.1 |
| 5,388,368 A * | 2/1995 | Lawrence | ................... | 43/44.9 |

\* cited by examiner

*Primary Examiner*—Kurt Rowan
(74) *Attorney, Agent, or Firm*—Venable LLP; Catherine M. Voorhees

(57) ABSTRACT

An implement for a fishing line includes a weighted body having two ends and a longitudinal axis there between where the weighted body is adapted to be placed on the fishing line about the longitudinal axis, a front portion disposed at one end of the weighted body along the longitudinal axis where the front portion has a slot for receiving the fishing line, and a rear portion disposed at the other end of the weighted body along the longitudinal axis where the rear portion has a slot for receiving the fishing line. The weighted body has a first groove extending along the rear portion, at least one groove that curves about a periphery of the weighted body from the first groove to a second groove extending along the front portion so that the fishing implement can capture the fishing line by wrapping the fishing line about the weighted body.

15 Claims, 7 Drawing Sheets

QUICK CHANGE FISHING IMPLEMENT

CROSS REFERENCE TO RELATED APPLICATION

This application claims the benefit of Provisional Application No. 60/712,836 filed on Sep. 1, 2005 which is incorporated herein by reference.

BACKGROUND OF THE INVENTION

1. Field of the Invention

The present invention relates to fishing line implements and, more particularly, to fishing sinkers or weights which are applied to a fishing line to submerge a fishing lure or bait attached to the line to various depths in a body of water, and are capable of being readily threaded and removed from the fishing line, without the need for cutting the fishing line and retying the line.

2. Description of the Prior Art

Fishing is an outdoor sport enjoyed by both young and old fishermen and women. The basic equipment for sport fishing include a barbed hook to hook the fish and a fishing line attached to the hook to pull the hooked fish to the fisherman. Various fishing tackle components, dependent on the type of fishing being undertaken, include rods, reels, floats, sinker weights, artificial bait, and beads.

Fishing tackle components are important to anglers for the function each component performs. For example, anglers use fishing sinkers to add weight to a fishing line and control the depth of the hook at the end of the line. Other fishing implements such as beads, which are light weight and have a hole through the longitudinal center, are also threaded to fishing lines for various purposes. Depending on the application and the fishing style, the angler will use sinkers and beads which are either in a sliding position or a fixed position. For example, for float fishing, a fishing sinker is attached to the fishing line near the fish hook. It is used to ensure that a baited fish hook drops to the depth where it is believed that fish are feeding. A bead is often used in the sliding position for slip float fishing. A line stop and the bead can prevent the float from sliding along the line beyond the line stop system. This, in effect fixes the depth of fishing, but does not limit the ability of a fishermen to reel-in the line.

Commercially available sinkers typically have an eyelet or hole through which the fishing line passes. Existing worm or bullet weights, with the eyelet or hole, can be used when an angler desires a sliding position for artificial lure fishing, such as is used in Texas or Carolina rig style fishing. With the sliding sinker style, the fishing line is inserted through the eyelet or hole and the sinker moves freely along the line in a sliding position. If an angler prefers a fixed position sinker, such as for float or bobber fishing, knots are tied in the line or on the line with a suitable material, to fix the position of the sinker. When the angler wishes to switch to a different style or size sinker, the line must be cut and a new sinker retied.

The primary advantage of using a slip sinker is that it allows a fish to pick up the lure or bait in its mouth and "run" with it for a short distance prior to swallowing it. Running with the lure or bait is a common behavior of many species of fish. It is thought that fish often behave in this manner in order to keep the lure or bait from the mouths of competing fish located nearby. Where the sinker is tied directly to the line, the fish feels its resistance almost immediately and often drops the lure or bait in alarm. The slip sinker eliminates this resistance and gives a fisherman a better chance to "set the hook" in the fish's mouth during the run.

However, as those who practice the art of fishing are well-aware, there are difficulties associated with having to cut, rethread, and retie one's fishing line in order to change the weight or size of a slip sinker. A common problem associated with fishing with slip sinkers is the time wasted in cutting, rethreading, and retying one's line in placing the weight on the line or in order to change the weight. This problem can be particularly annoying and troublesome for people who participate in fishing tournaments, as it is often necessary to quickly change or add weight to one's line when fishing in a tournament.

A second problem of conventional slip sinkers is that many people, such as young children or first-time fishermen, do not know how to properly tie a fishing knot. A few days spent trying to tie knots, and losing fish because of poorly tied knots, can frustrate and discourage even the most enthusiastic beginner. Poorly tied knots are one of the main reasons for losing fish.

Tying knots is extremely difficult on cold, wet, and windy days, even for experienced fishermen. In addition to the discomfort associate with trying to tie a knot with wet, slippery hands that are stiffened because of cold, windy, and rainy weather, there are also the difficulties of eyesight and steadiness that must be adequate to enable one to thread the line through the eyelet.

In an effort to overcome the problems associated with tying knots in or on the fishing line, one type of existing sinker has a strip of rubber extending through the center of the sinker and outward from the top to the bottom. When the fishing line has been inserted in this sinker and positioned along the line, the extending rubber ends are twisted in a secondary step to secure and fix the position of the sinker. While this eliminates the problem of having to cut the line to change the sinker, the sinker can only be attached to the line in a fixed position. Additionally, this type of fixed sinker is very expensive.

Alternatively, some sinkers have a fishing line-receiving slot which can be closed with extending tabs to trap the line. The fishing line is inserted in the slot and the sinker is positioned along the line. A secondary step then requires that the tabs be folded over the line to hold the sinker to the line. An advantage of this style sinker is that, depending on how tight the tabs are folded, the sinker may be positioned in a sliding or a fixed position. However, the tabs have a tendency to break off, requiring frequent replacement of the sinker.

U.S. Pat. No. 778,669 discloses a fish line float of elongated hydrodynamic design having a radial slot formed along the body for receipt therein of a fishing line. A pin is inserted in each end of the float, each pin having a loop at the exterior distal end thereof. The fishing line in the slot is thereafter threaded through the loops to hold the float in place on one's line. This invention does not allow slippage of the float even though the line need not be cut to put on or take off the float.

U.S. Pat. No. 2,137,341 discloses a float-popper having a central bore through which a fishing line is passed and then tethered therein by insertion of a tapered pin along the central axis. Again, this invention allows for addition of the float to the line without separating the line but does not allow slippage of the float along the line thereafter.

U.S. Pat. No. 3,628,279 discloses a fish lure retriever having a lengthwise slot formed in an outer circular metal casing and a radial slot formed in an inner tapered resilient plug that is adapted to slide partially in and out of the casing. The fishing line is slipped through both slots to mount the retriever on the line and then the retriever is lowered into the water to contact a snagged lure for recovery. Although this invention does not require any cutting or tying of the line, it does involve rethreading. More importantly however, this invention does not address any of the problems associated with fishing weights, because it is used to retrieve snagged lures.

U.S. Pat. No. 5,157,860 discloses a sinker having a radial slot for receipt of a fishing line and then the slot is filled with a thin rubber or plastic insert to keep the sinker from falling off of the line. In order to change sinkers, the insert must be pried out of the sinker/weight. Furthermore, if one wants to use the weight as a slip sinker, one must be careful not to reinsert the insert too far. Pushing the insert into the weight too far could cause the weight to be wedged tightly against the line which would inhibit or prevent the line from moving freely through the body of the weight, thus, causing the weight to not function like a slip sinker. Such an adjustment of the insert is time-consuming and does not solve the tournament fisherman's problem of the need for speed in changing or adding weight.

This patent also does not overcome the problem of changing weight when ones hands are cold, wet, and slippery. In order to add or change weight, one must pry out and push in the insert, which can be a painful and frustrating experience for one with cold, stiff fingers. Furthermore, cold weather causes finger dexterity to be limited so it can be difficult to hold and coordinate three separate parts (e.g., the line, the insert and the weight). Thus, difficulties remain with the invention taught by U.S. Pat. No. 5,157,860.

U.S. Pat. No. 5,239,770 is directed to a quick on and off fishing sinker. However, it is still necessary to thread the sinker to have either a slip sinker or a stationary sinker.

Finally, U.S. Pat. No. 5,784,828 discloses another slip-on fishing weight having a cylindrical tube with a radial slot that can be turned inside the shell of the weight. Thus, this weight requires one to line up the slot in the cylindrical tube with the slot in the shell of the weight and then turn the same. A simpler system for attaching a weight to a line, without cutting or tying, is needed.

SUMMARY OF THE INVENTION

Applicant overcomes shortcomings in the prior art with his inventive fishing implement, such as a sinker or weight, that allows a fisherman to place the fishing implement anywhere on the fishing line by simply looping or threading the fishing line around the periphery of the fishing implement, either clockwise or counter-clockwise, until the fishing line is threaded to the inside of the fishing implement. As a result of the inventive structure according to the invention, a fisherman can change the sinker or weight or other fishing implement, such as a float, on the fishing line without having to cut the fishing line, thread the sinker and retie the fishing line.

According to the invention, once the fishing line is threaded through the interior of the implement by wrapping the fishing line through grooves around the periphery of the implement body, the fishing line is securely surrounded by the body of the fishing implement and the sinker can move freely up and down the fishing line as a "slip sinker".

The fishing weight for a fishing line according to one embodiment of the invention includes a weighted body having a specific gravity greater than one, a middle section, two ends and a longitudinal bore or axis there between where the weighted body is adapted to being placed on the fishing line about the longitudinal axis; a front insert portion disposed at one end of the weighted body along the longitudinal axis where the front insert portion has a slot for receiving the fishing line; and a rear insert portion disposed at the other end of the weighted body along the longitudinal axis where the rear insert portion has a slot for receiving the fishing line. The weighted body has a first groove extending substantially parallel along the longitudinal axis of the rear insert portion, at least one groove that curves about a periphery of the middle section of the weighted body from the first groove to a second groove that extends substantially parallel along the longitudinal axis of the front insert portion wherein the at least one groove that curves around the periphery of the middle section includes a third groove that extends from an end of the first groove, curves toward the rear end of the weighted body forming an acute angle with the first groove, curves about a quarter of the periphery and then curves toward the front end of the weighted body for another quarter of the periphery until it intersects with a fourth groove parallel to the longitudinal axis where the third groove forms an obtuse angle with the fourth groove and the beginning of the third groove and the end of the third groove are approximately in the same plane so that the fishing weight can be rotated about the fishing line to capture the fishing line along the longitudinal axis of the weighted body.

The front portion and rear portion may be parts on either side of a one-piece construction core element. In an alternative embodiment, the front portion is a separate element from the rear portion.

In another embodiment according to the invention, the weighted body may be elongated in the shape of a bullet having a front narrow end and a wider rear end. The fishing implement would include a weighted body having a front slot that allows a fishing line to be received and enter spiral openings of a core portion and a rear slot the allows the fishing line to exit the core. The front and rear slots would be small cuts in the weighted body that allow a fishing line to be pushed to the center or axial bore of the weighted body through the spiral openings of the core. Thus, according to this embodiment of the invention, it would be possible to thread the fishing line on the inventive sinker by feeling the front slot and inserting the fishing line into the inner spiral core and then turning the sinker until the fishing line is through spiral core and entered the axial bore.

In another embodiment, a small notch or protrusion may be formed in the front and/or rear slot so that the fishing line can be held inside the axial bore of the weighted sinker. The Applicant envisions that the spiral core, front and rear slot and protrusions can be formed in an injection molding process. If separate front and rear portions are used, the weighted body would be formed in an injection molding process and then, the front portion and rear portion would be press fitted in a secondary process. The preferred materials of the sinker according to an embodiment of the invention, may be a mixture of Tungsten (and additional materials for processing) or a mixture of Tungsten in combination with an x-material mixture.

In yet another invention, a soft weight or sinker made of similar material as the weighted body of the fishing implement. This soft weight or sinker is made of material that is not as hard as the material of the weighted body so that the a hook can penetrate the sinker material. The material of the soft weight or sinker would have "healing" properties to allow the hole made by the hook to close around the hook or line, and to allow the soft sinker to be reusable after it is removed from a hook. Thus, a fisher person can customize the hook with these weights.

The soft sinker does not need a hole due to the above property of the Tungsten or Tungsten mixture material. A user would simply thread the soft sinker onto the hook by inserting the hook point into the sinker and sliding it onto the hook to add weight. One could also continue sliding the soft sinker past the hook until it is on the line itself. The "healing" properties of the soft sinker material will allow the hole made by the hook to close around either the fishing line or the hook depending upon where the weight is needed. The soft sinker would be removed from the line or the hook by unthreading the sinker as if it were plastic bait.

The shape of the soft sinker may be round or bullet-shaped. The weight of these soft sinkers depends upon the density of the material composition. Thus, a soft sinker of one physical size could have multiple weights due to the varying density of the material.

The embodiment of the soft sinker according to the invention may be made used with any hook size or style that is used for fishing where additional weight may be needed. In addition, the weights of the soft sinker may vary depending upon the type of fishing that is being done. For example, if one if fishing in an area which is tidal or has a current and the current increases or decreases, it may be necessary to change the weight of the hook to keep the hook at the location where the fish are biting. If the area is also grassy or has seaweed, a hook with the weight built-in via the soft sinker would streamline the hook and fishing line thereby avoiding possible snags while still providing the necessary weight.

BRIEF DESCRIPTION OF THE DRAWINGS

FIG. 1 D is an enlarged view of front portion 24 of FIG. 1 C;

DETAILED DESCRIPTION OF THE DRAWINGS

Figure 1A:
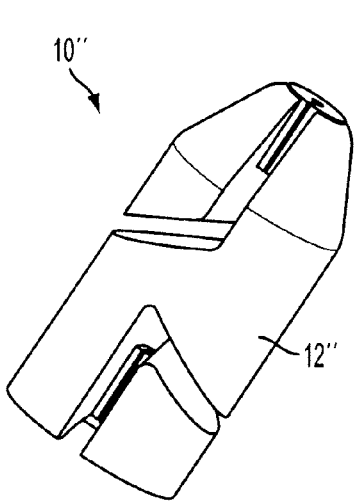
FIGS. 1 A-C are perspective views showing a small, medium and large sinker or weight according to an embodiment of the invention.
Figure 1B:
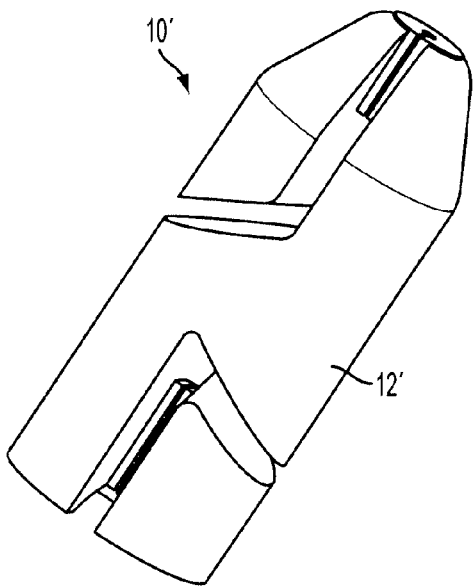
Figure 1C:
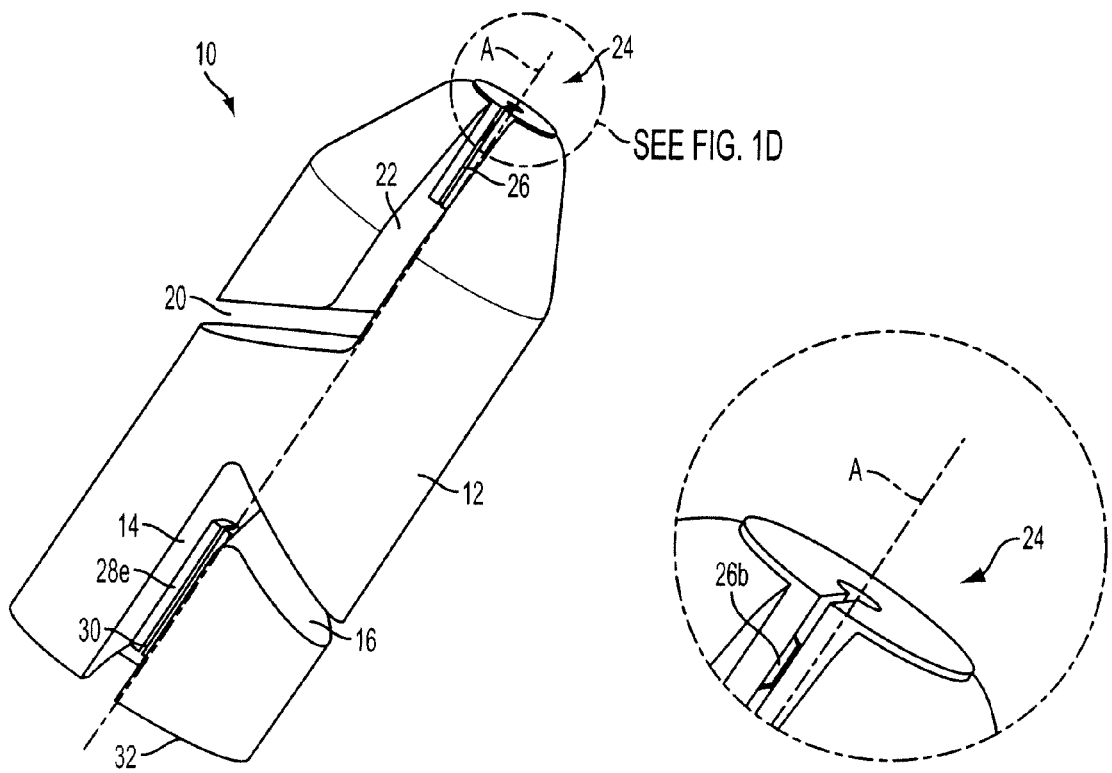
Figure 1D:
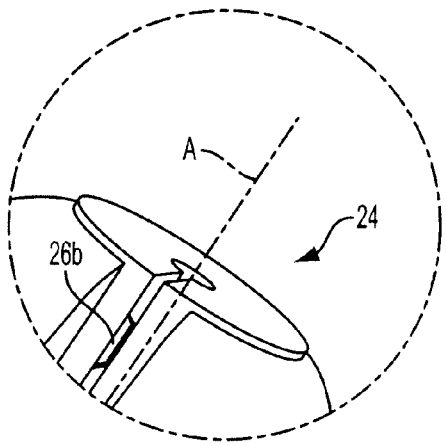

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

As shown in FIGS. 1 A-C, an implement for a fishing line, such as a weight or a sinker 10, may be made in a number of physical sizes (e.g., large 10, medium 10' and small 10". The sinker will be described with respect to one size of the sinker; however similar reference characters will be primed or double primed to show corresponding structure on larger sizes. According to one embodiment of the invention, the sinker 10 includes a weighted body 12 having two ends and a through cavity (longitudinal axis A) there between. Weighted body 12 is adapted to be placed on the fishing line about the through cavity along the longitudinal axis, and may be formed by an injection molding process to create grooves 14, 16, 18, 20, 22 which form a continuous groove around the periphery of weighted body 12 (see FIGS. 2-4 of the application).

Figure 7:
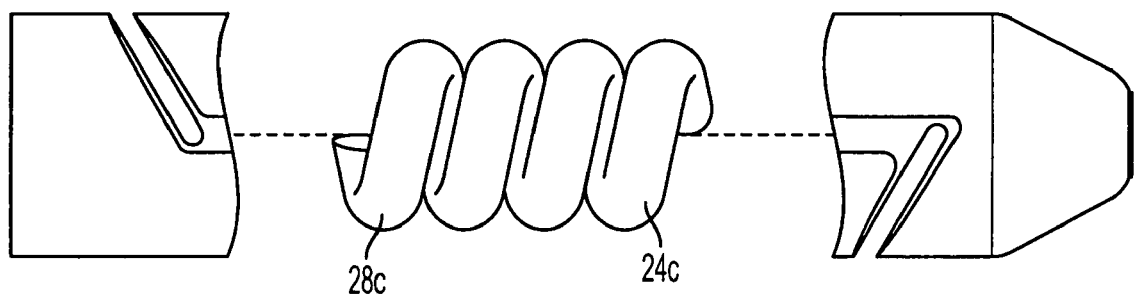
FIG. 7 shows, in exploded form, the inner spiral core and an outer weighted shell of another embodiment of the sinker or weight according to the invention.

At the upper end of weighted body 12, a front portion 24 is disposed along the longitudinal axis A. The front portion 24 has a slot 26 for receiving the fishing line. A small notch or protrusion 26b is formed in slot 26 so that the fishing line can be held in a cavity along longitudinal axis A of the weighted sinker, as shown in FIGS. 1 C-D. On the other end of the weighted body 12 a rear portion 28 is disposed along the longitudinal axis A. The rear portion 28 has a slot 30 for receiving the fishing line. In FIGS. 1 A-C, the front portion 24 and the rear portion 28 are two separate elements, which are spaced apart from one another on either end of weighted body 12. After the weighted body 12 is formed in an injection molding process, the front portion 24 and the rear portion 28 are press fitted into grooves 22, 14, respectively along the longitudinal axis A. In another embodiment, the front portion 24c and the rear portion 28c may be parts of a one-piece construction core element, as shown in FIG. 7.

A fisher person pushes fishing line into either slot 28, 30 and turns weighted body 12 about longitudinal axis A so that the fishing line is wrapped around grooves 14, 16, 18, 20, 22. The weighted body 12 has a first groove 14 extending along the rear portion 28, at least one groove 16, 18, 20 that curves about a periphery of the weighted body 12 from the first groove 14 to a second groove 22 extending along the front portion 24 so that the fishing implement 10 can be rotated about the fishing line to capture the fishing line along the longitudinal axis A of the weighted body 12. This "captured" fishing line does not require tying a knot and does not require threading the fishing line through an eye, and the fishing implement 10 of this embodiment can move freely up and down the fishing line, as it is not fixed to the fishing line.

The first groove 14 extends along longitudinal axis A of weighted body 12. Rear portion 28 includes a circular flange 28f and an extension 28e. Extension 28e may be disposed in the groove from the center of base 32 of weighted body 12 upward to just below the curvature of groove 16. That is, circular flange 28f snugly rests against the center of the base 32 and the first groove 14 is longer in length than the length of rear portion 28. Likewise, front portion 24 includes a circular flange 24f and an extension 24e. Extension 24e may be disposed within second groove 22 from the center of the top 34 of weighted body 12 to a distance approximately halfway to the upper curved groove 20. When separate elements are used, the lengths of front and rear portions 24, 28 are approximately equal so that the weighted body is balanced.

Figure 2:
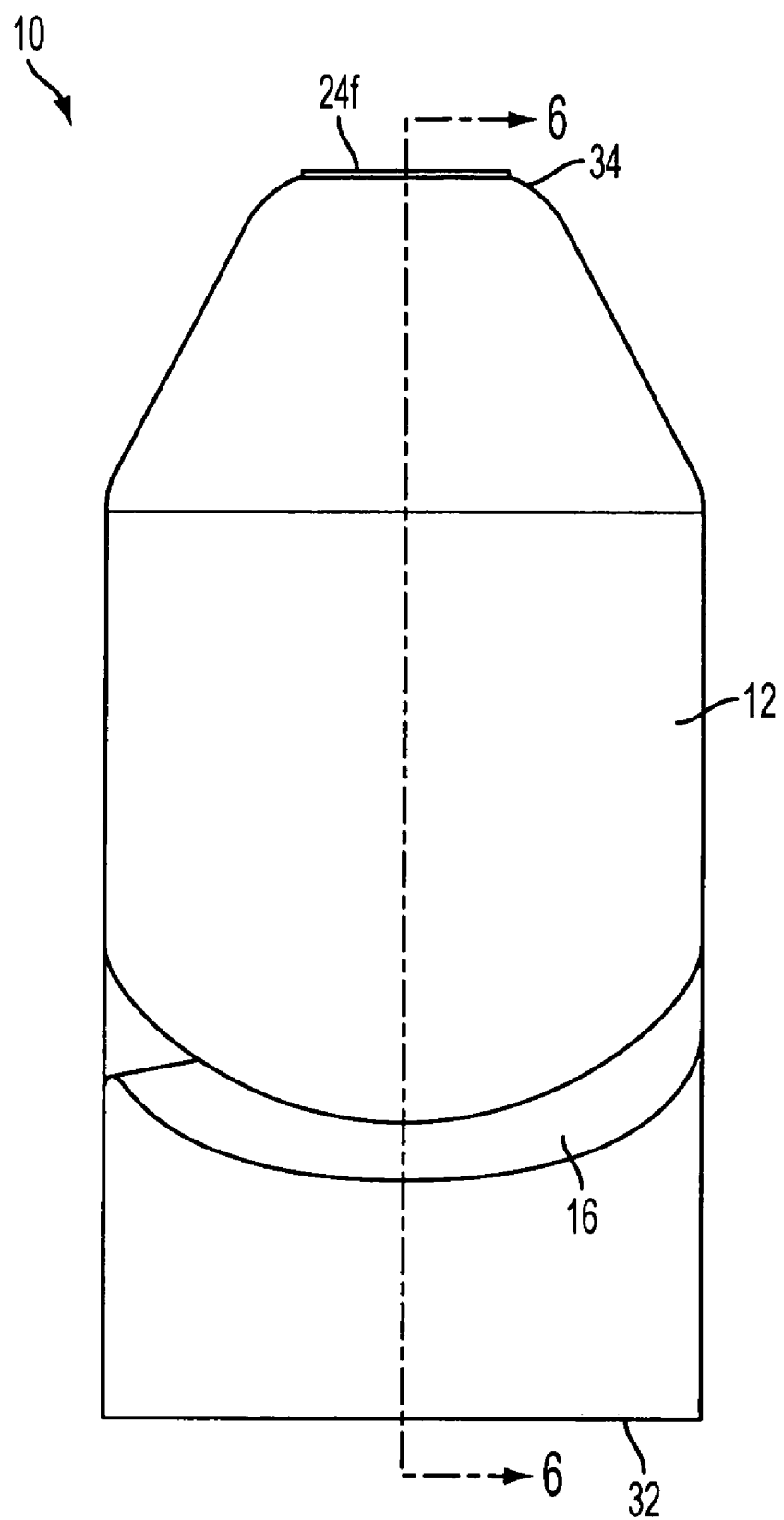
FIG. 2 is a front view showing the lower curved groove of a sinker or weight according to FIG. 1.
Figure 3:
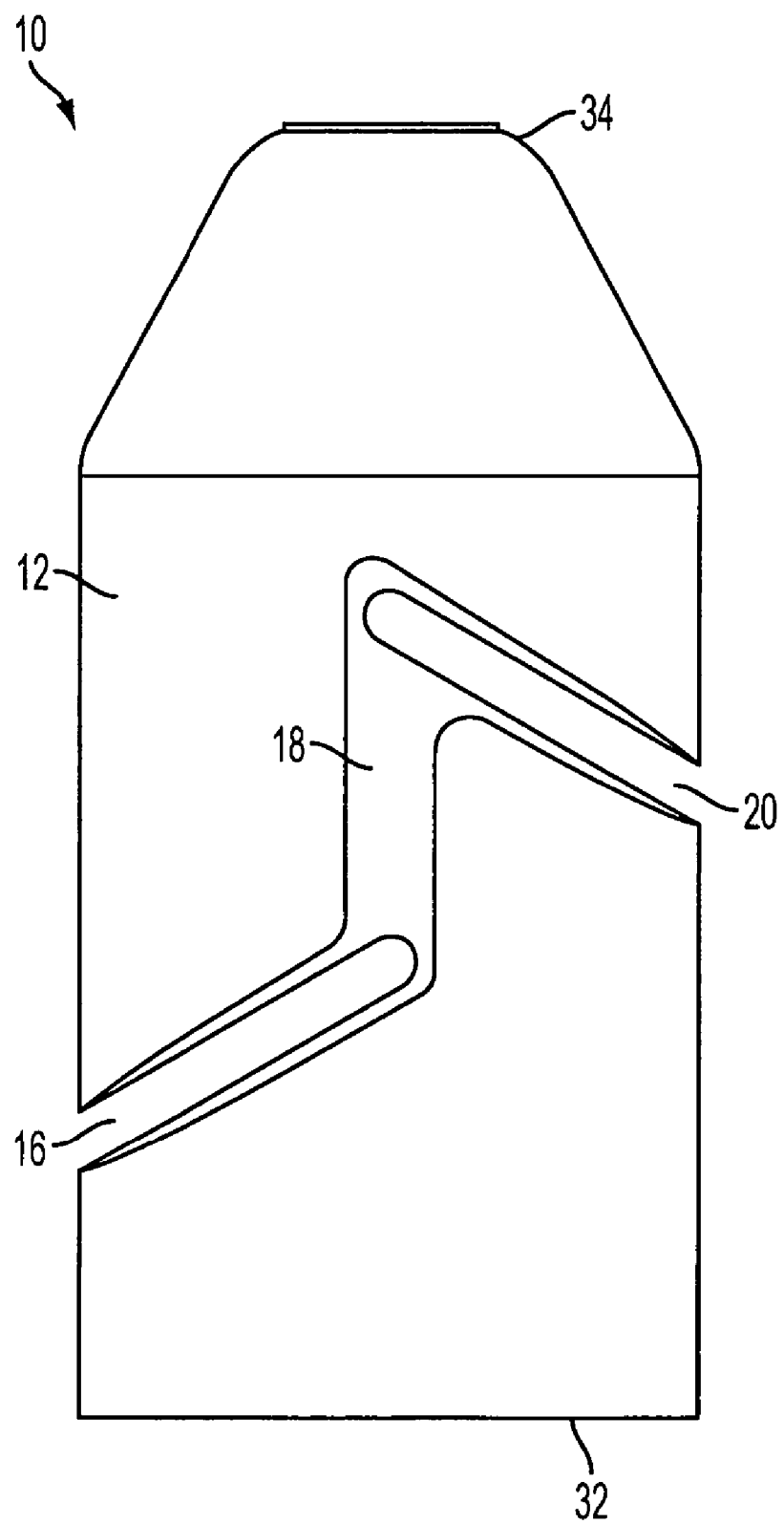
FIG. 3 illustrates a side view showing lower and upper curved grooves and the vertical groove connecting the two of a sinker or weight shown in FIG. 1.
Figure 4:
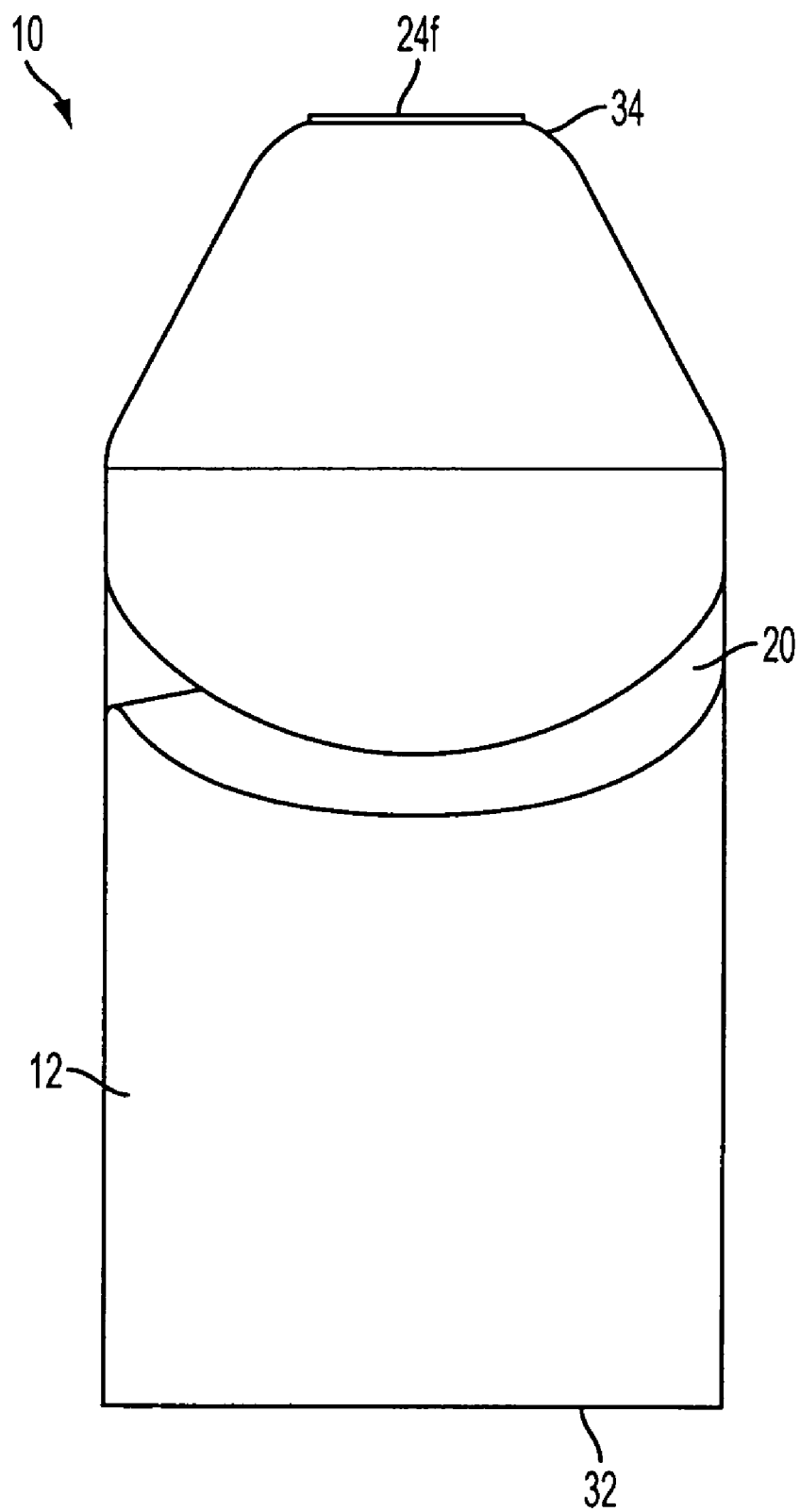
FIG. 4 is a rear view showing the upper curved groove of a sinker or weight according to FIG. 1.

As shown in FIG. 1, the first groove 14 extends vertically upward about a third of the height of the weighted body 12. A third groove or lower curved groove 16 begins at the top of first groove 14, as shown in FIG. 1. Groove 16 curves toward the base 32 of the weighted body 12 forming an acute angle with first groove 14, curves about a quarter of the periphery and then curves toward the front end 34 of the weighted body 12 for another quarter of the periphery as shown in FIG. 2. The beginning of the third groove 16 and end of the third groove 16 are approximately in the approximate, same plane. A fourth groove 18 (shown in FIG. 3) forms an obtuse angle with the third groove 16 and extends vertically along the longitudinal axis A of the weighted body from the end of the third groove 16 to about two-thirds of the height of the weighted body 12. A fifth groove or upper curved groove 20 curves toward the base 32 of the weighted body forming an acute angle with fourth groove 18, curves about a quarter of the periphery and then curves toward the front end 34 of the weighted body 12 for another approximate quarter of the periphery, as shown in FIG. 4. The beginning of the fifth groove 20 and the end of the fifth groove 20 are in the approximate, same plane. And, as shown in FIG. 1, fifth groove 20 forms an obtuse angle with second groove 22.

Three exemplary sizes of the weighted body 12 in the shape of a bullet are shown in FIG. 1. The small weighted body 12", in one embodiment, may be 0.750 inches in height and have a diameter of 0.360 inches creating a volume of 0.0525 cubic inches. The small size implement 10" may be made in three weight classes (e.g., 1/16, 1/8, and 3/16 oz.). The medium weighted body 12', in one embodiment, may have a length or height of 1.050 inches and a diameter of 0.410 inches creating a volume of 0.1039 cubic inches. The medium size implement 10' may be made three weight classes (e.g., 1/4, 5/16, and 3/8 oz.). The large weighted body 12, in one embodiment, may have a length or height of 1.160 inches and a diameter of 0.470 inches creating a volume of 0.1505 cubic inches. The large size implement 10 may be made four weight classes (e.g., 1/2, 5/8, 3/4 and 1 oz.). The weight of the fishing implement 10 will be determined by the mix of Tungsten and other materials, such as plastic, copper, stainless steel, etc. to obtain the desired density for each while retaining the same physical size for each category (e.g., small, medium, large). Depending upon the type of fishing and the weight needed, other sizes of the weighted body are envisioned. The ratio of the diameter to the length of the weighted body is in the range of 38% to 48%. That is, a weighted body with a diameter, which is 38% to 48% of the weighted body length achieves an effective sinker or weight.

Figure 5:
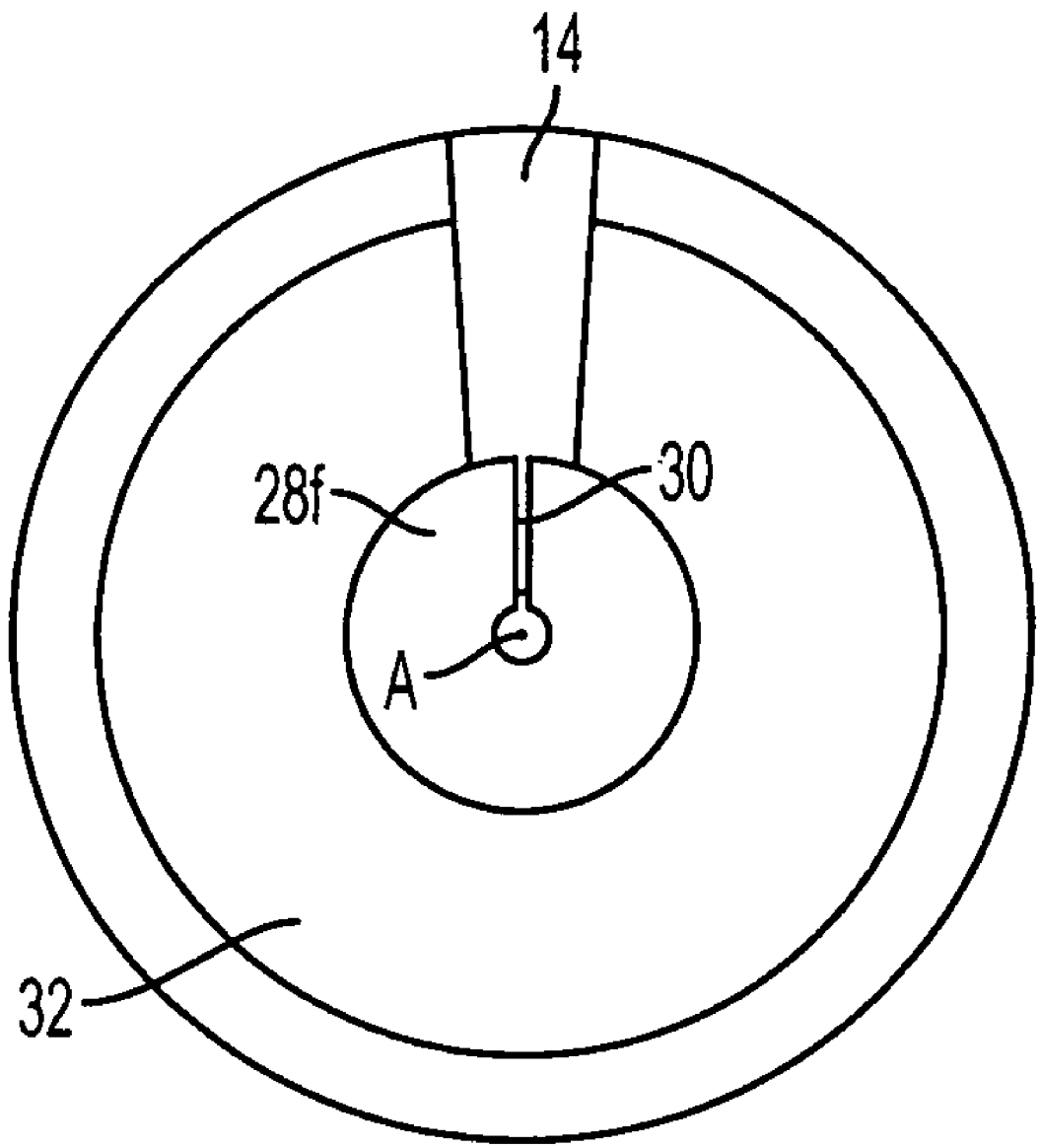
FIG. 5 is a bottom view of a sinker or weight shown in FIG. 1.
Figure 6:
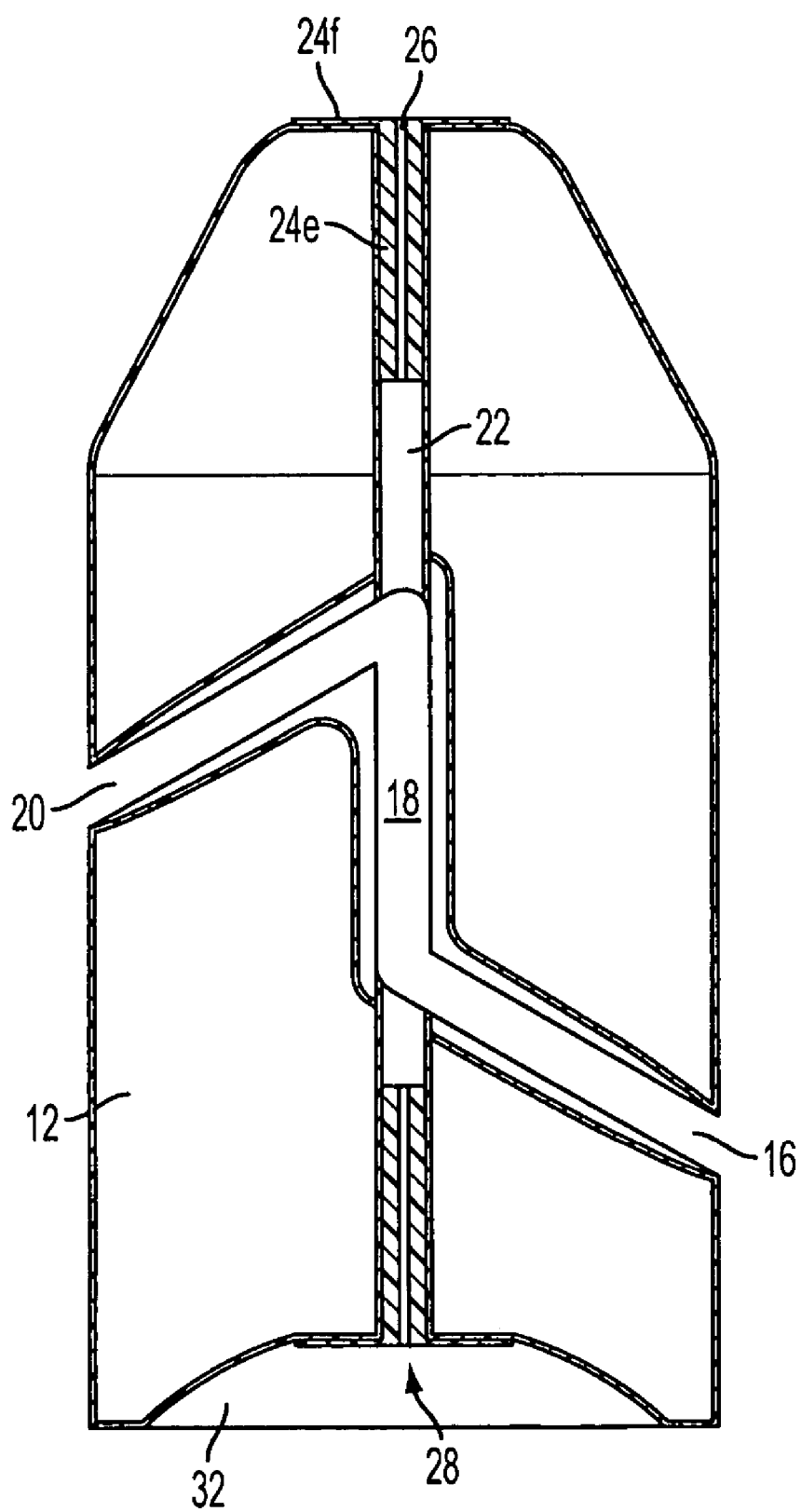
FIG. 6 is a cross-section through the longitudinal center of a sinker or weight shown in FIG. 1.

Looking at FIGS. 5 and 6, base 32 of weighted body 12 is recessed in a dome shape so that circular flange 28f of rear portion 28 rests against an inside rear surface of the bullet-shaped weighted body 12. As the cross section of FIG. 6 show, a fisher person can easily wrap fishing line around the curved grooves 16, 20 and then push the fishing line in slots 26, 30 of front portion 24 and the rear portion 28, respectively to capture the fishing line by the weighted body 12. And the fishing line is not easily released due to the curvature of grooves 16, 20.

Each physical size of the weighted body can be made to more than one weight class by varying the material composition to achieve different densities for each physical size of the weighted body. For example, if fishing sinkers or weights are made, the density of the material would have a specific gravity greater than one so that the weight sinks into the water (e.g. 1/16 oz. to 1 oz.). The actual weight of the fishing implement 10 is determined by varying the materials used to make the weighted body 12 and body portions 24, 28. Consequently, a fishing implement 10 can have the same outward appearance in design (e.g., height and diameter) and be made in different weight classes. While smaller fishing implements are better in that the weights are not as bulky and do not interfere with the fishing action, other larger physical sizes are envisioned in order to obtain heavier weights of the desired 10 plus different weight classes.

The concept of using one physical size mold to achieve different weight classes is believed to be new in the fishing tackle art. The use of one size mold and the varying of the material composition to achieve different weight classes reduces manufacturing costs as only 3 molds are needed for 10 different weight classes.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A fishing weight for a fishing line that is adapted to submerge a fishing lure or bait attached to the fishing line at various depths in a body of water comprising:
    a weighted body having a specific gravity greater than one, a middle section, two ends and a longitudinal bore or axis there between, said weighted body being adapted to be placed on the fishing line about the longitudinal axis;
    a front insert portion disposed at one end of the weighted body along the longitudinal axis, the front insert portion having a front slot disposed along the longitudinal axis for receiving the fishing line; and
    a rear insert portion disposed at the other end of the weighted body along the longitudinal axis, the rear insert portion having a rear slot disposed along the longitudinal axis for receiving the fishing line,
    wherein the front insert portion is spaced from the rear insert portion and the weighted body has a first groove, which extends substantially parallel along the longitudinal axis of the rear insert portion, at least one groove that curves around a periphery of the middle section of the weighted body from the first groove to a second groove that extends substantially parallel along the longitudinal axis of the front insert portion wherein the at least one groove that curves around the periphery of the middle section includes a third groove that extends from an end of the first groove, curves toward the rear end of the weighted body forming an acute angle with the first groove, curves about a quarter of the periphery and then curves toward the front end of the weighted body for another quarter of the periphery until it intersects with a fourth groove parallel to the longitudinal axis where the third groove forms an obtuse angle with the fourth groove and the beginning of the third groove and the end of the third groove are approximately in the same plane so that the fishing weight can be rotated about the fishing line to capture the fishing line along the longitudinal axis of the weighted body and wherein the front and rear slots hold the fishing line in the respective slot along the longitudinal axis.

2. The weight for a fishing line according to claim 1, wherein the weight can move freely up and down the fishing line.

3. The weight for a fishing line according to claim 1, wherein the front insert portion and the rear insert portion are parts of a one-piece construction element.

4. The weight for a fishing line according to claim 1, wherein the first groove extends along the longitudinal axis of the weighted body past the rear insert portion.

5. The weight for a fishing line according to claim 1, wherein the second groove extends along the longitudinal axis of the weighted body past the front insert portion.

6. The weight for a fishing line according to claim 1, wherein the at least one groove of the weighted body includes the fourth groove that extends toward the front end along the longitudinal axis of the weighted body from the end of the third groove and a fifth groove forming an acute angle with the end of the fourth groove closest to the front end where the fifth groove curves toward the rear end of the weighted body about a quarter of the periphery of the weighted body and then curves toward the front end of the weighted body for another approximate quarter of the periphery forming an obtuse angle with the second groove where the beginning of the fifth groove and the end of the fifth groove are in the same plane.

7. The weight for a fishing line according to claim 1, wherein the weighted body has the shape of a bullet.

8. The weight for a fishing line according to claim 7, wherein the front insert portion has a circular flange that rests against the front end of the bullet-shaped weighted body and an extension attached to the circular flange that is mounted into the second groove.

9. The weight for a fishing line according to claim 7, wherein the rear insert portion has a circular plate that rests against the rear end of the bullet-shaped weighted body and an extension attached to the circular flange that is mounted into the first groove.

10. The weight for a fishing line according to claim 7, wherein the bullet-shaped weighted body has a recessed rear end portion.

11. The weight for a fishing line according to claim 1, wherein the weighted body is composed of Tungsten and other materials to obtain the desired density.

12. The weight for a fishing line according to claim 1, wherein the weighted body is made of varying material compositions so that different weights are achieved.

13. The weight for a fishing line according to claim 12, wherein the weighted body has one physical size and that physical size may have at least 3 different weight classes depending upon density of the material forming the weighted body.

14. The weight for a fishing line according to claim 1, wherein one of a small notch or protrusion is formed in the front and rear slots so that the fishing line is held inside a cavity along the longitudinal axis of the weighted body, and the weighted body, front and rear slot and small notches or protrusions are formed in an injection molding process.

15. The fishing weight according to claim 14, wherein the front and rear slots hold the fishing line in the longitudinal axis of the weighted body while enabling the fishing weight to move freely up and down the fishing line.

* * * * *